(12) United States Patent
Zakrzewski

(10) Patent No.: US 8,902,914 B2
(45) Date of Patent: Dec. 2, 2014

(54) APPARATUS, METHOD AND SYSTEM FOR MANAGING DATA TRANSMISSION

(75) Inventor: Robert Zakrzewski, Bristol (GB)

(73) Assignee: SCA IPLA Holdings Inc., New York, NY (US)

( * ) Notice: Subject to any disclaimer, the term of this patent is extended or adjusted under 35 U.S.C. 154(b) by 18 days.

(21) Appl. No.: 13/816,734

(22) PCT Filed: Aug. 15, 2011

(86) PCT No.: PCT/GB2011/051538
§ 371 (c)(1),
(2), (4) Date: Apr. 11, 2013

(87) PCT Pub. No.: WO2012/022966
PCT Pub. Date: Feb. 23, 2012

(65) Prior Publication Data
US 2013/0215850 A1    Aug. 22, 2013

(30) Foreign Application Priority Data
Aug. 20, 2010 (GB) .................................. 1013986.3

(51) Int. Cl.
*H04L 12/28* (2006.01)
*H04W 52/02* (2009.01)
*H04W 4/00* (2009.01)
*G08C 17/00* (2006.01)
*H04W 72/12* (2009.01)

(52) U.S. Cl.
CPC .......... *H04W 4/005* (2013.01); *H04W 72/1242* (2013.01); *H04W 72/1221* (2013.01); *H04W 52/0261* (2013.01)

USPC .......................................... 370/412; 370/311

(58) Field of Classification Search
None
See application file for complete search history.

(56) References Cited

U.S. PATENT DOCUMENTS

| | | | |
|---|---|---|---|
| 6,094,692 A | 7/2000 | Kalkunte | |
| 6,298,055 B1 * | 10/2001 | Wildfeuer | 370/352 |
| 8,462,684 B1 * | 6/2013 | Kopikare et al. | 370/311 |
| 2003/0152094 A1 * | 8/2003 | Colavito et al. | 370/412 |
| 2004/0257995 A1 * | 12/2004 | Sandy et al. | 370/235 |
| 2006/0233265 A1 * | 10/2006 | Rajan et al. | 375/259 |

(Continued)

FOREIGN PATENT DOCUMENTS

| | | |
|---|---|---|
| EP | 0 360 721 A2 | 3/1990 |
| JP | 2000-252983 A | 9/2000 |

(Continued)

OTHER PUBLICATIONS

Office Action issued Dec. 10, 2013 in Japanese Patent Application No. 2013-525356.

(Continued)

*Primary Examiner* — Clemence Han
(74) *Attorney, Agent, or Firm* — Oblon, Spivak, McClelland, Maier & Neustadt, L.L.P.

(57) ABSTRACT

An apparatus for managing data transmission in a telecommunications system, including a buffer unit arranged to receive data from one or more sources of data and to forward the data to a transmitter for transmission. The buffer unit is configured to delay the transmission of the data by storing the data for a time before forwarding it to the transmitter. The buffer unit is also configured to forward the stored data to the transmitter for transmission when an amount of data stored in the buffer unit reaches a predefined threshold.

18 Claims, 7 Drawing Sheets

(56) References Cited

U.S. PATENT DOCUMENTS

| | | | |
|---|---|---|---|
| 2008/0059658 A1* | 3/2008 | Williams | 710/8 |
| 2009/0129355 A1 | 5/2009 | Lin | |
| 2009/0147796 A1 | 6/2009 | Chow | |
| 2009/0248921 A1 | 10/2009 | Kim | |

FOREIGN PATENT DOCUMENTS

| | | |
|---|---|---|
| JP | 2003-293399 A | 10/2003 |
| JP | 2009-123044 A | 6/2009 |
| JP | 2010-125734 A | 6/2010 |

OTHER PUBLICATIONS

Office Action issued Apr. 1, 2014 in Japanese Patent Application No. 2013-525356.

Jean-Lien C. Wu, et al., "Comparison of Power Saving Schemes for Sink Nodes in Wireless Sensor Networks" Proceedings of the 18$^{th}$ International Conference on Advanced Information Networking and Application , XP10695253A, 2004, 4 pages.

Jongsoo Jeong, et al., "A QoS-Aware Data Aggregation in Wireless Sensor Networks" XP31653963A, ICACT 2010, pp. 156-161.

* cited by examiner

RELATED ART

APPARATUS, METHOD AND SYSTEM FOR MANAGING DATA TRANSMISSION

BACKGROUND

The present invention relates to communication systems and more particularly to methods and apparatus for managing data transmission in communications system.

Communication systems, particularly wireless telecommunication systems, that allow data to be transmitted from a transmitter to a receiver in a network are well known and commonly used. Examples include systems arranged in accordance with the IEEE 802.11 set of standards (sometimes referred to as "WiFi") and mobile communication networks arranged in accordance with the 3GPP standards, 3GPP systems include communication systems using the General Packet Radio System (GPRS), UMTS systems employing the Enhanced Uplink (EUL) (sometimes referred to as High Speed Uplink Packet Access (HSUPA)) and systems arranged in accordance with the more recently defined Long Term Evolution (LTE) standard.

Whilst these communication systems typically provide high data rates over robust radio links, at present they are not always well suited to all data communication applications. For example, machine type communication (MTC) systems (sometimes referred to as machine to machine (M2M) systems) permit autonomous or semiautonomous devices to transmit data across a wireless network, such as a conventional mobile telecommunication network. Examples of MTC communication systems include so-called "smart meter" systems in which a transmitting device is located on a premises and transmits data to a central server regarding a user's consumption of a utility such as electricity or water. MTC communication systems typically involve the transmission of relatively low quantities of non-time critical data at relatively infrequent intervals. Such data can be inefficient to transmit using conventional wireless communication systems as the quantity of signalling data may be relatively large compared to the amount of data to be transmitted. Accordingly, a disproportionately high amount of signalling data may be transmitted to support the transmission of relatively small amounts of data.

SUMMARY OF INVENTION

In accordance with a first aspect of the present invention there is provided an apparatus for managing data transmission in a telecommunications system, the apparatus comprising a buffer unit arranged to receive data from one or more sources of data and to forward the data to a transmitter for transmission, wherein the buffer unit is configured to accumulate data before forwarding the data to the transmitter and to forward accumulated data to the transmitter when an amount of data accumulated in the buffer unit reaches a predefined threshold.

Thus in some respects the buffer unit may be seen as being configured to delay the transmission of the data by storing the data for a time before forwarding it to the transmitter, the data being forwarded to the transmitter when an amount of data stored in the buffer unit reaches a predefined threshold (or earlier if another condition is met for triggering transmission).

In some communication systems transmitting data as soon as it is available to be transmitted can be very inefficient, for example when data is intermittently transmitted in bursts of low quantities of data. In systems such as wireless data transmission systems this may be an inefficient use of valuable network resources as signalling information must be exchanged between the data transmitting device and the receiver before each small burst of data is transmitted. The exchange of the signalling information to transmit the small amount of data reduces the ability for other devices in the system to access the network resources, therefore reducing overall system efficiency. Moreover, the frequent exchange of signalling information with the network can be very power consuming, thus reducing the length of time during which an internal power source in the transmitting device such as a battery can provide power, for example.

Thus in accordance with embodiments of the invention, data to be transmitted from a data transmitting apparatus is stored (accumulated) in a buffer prior to transmission. The data in the buffer is transmitted when a quantity of data stored in the buffer reaches a predetermined data threshold. Accordingly, rather than transmitting many bursts of small amounts of data, the data transmitting apparatus instead transmits a reduced number of bursts each with an increased amount of data. This provides a more efficient use of network resources as a reduced amount of signalling information is needed between the transmitting device and the network to transmit the same data (i.e. there is reduced signalling overhead). Moreover, the power efficiency, i.e. in terms of reduced power consumption, for the transmitting device may also be improved.

In accordance with an example of the present invention, the buffer unit may be configured to forward the stored data to the transmitter for transmission before the amount of data stored in the buffer unit reaches the predefined threshold if there is data in the buffer that has been stored for more than a predefined time period.

In accordance with this example of the invention, whilst data may be stored in the buffer prior to transmission until a predefined amount of data is accumulated/aggregated, a time period is also predefined to help ensure that data does not remain in the buffer for more than what is considered to be a maximum allowable period of time for the implementation at hand. As a result, if the rate at which data is received by the buffer from the data source drops, data that is already in the buffer will remain un-transmitted for no longer than the defined maximum period of time. For example, the apparatus may be configured to transmit delayed data after 24 hours even if no other data has been received to fill the buffer to the predefined trigger threshold for transmission.

In accordance with another example of the invention, the buffer unit may be configured to forward the stored data to the transmitter for transmission before the amount of data stored in the buffer unit reaches the predefined threshold if further data is received by the buffer unit which is classified as data that should not be delayed.

Thus while data from some data sources may be "delay tolerant", i.e. an application associated with a particular data stream may readily be able to tolerate a delay in receiving the data because it is not time critical, other data sources may relate to delay intolerant data, i.e. data that cannot be delayed in the buffer. For example, whereas data packets associated with a stock control message indicating a certain item has been moved from a warehouse need not be transmitted in "real-time", packets of data associated with an alarm message from a sensor indicating a possible fire in the warehouse should be transmitted with as small a delay as possible. Thus in accordance with this example, if delay intolerant data (time critical data) is received by the buffer unit, the contents of the buffer unit may then transmitted en bloc. That is to say, since a connection between the data transmitting device and the receiving network needs to be established for the delay intolerant data anyway, the delay tolerant data may as well be transmitted at the same time.

Accordingly, whilst the advantages described above associated with providing the buffer unit are still realised, this is not at the expense of reduced performance in more quickly transmitting data from delay intolerant data streams.

In accordance with another example of the invention, data received from the one or more sources of data may comprise data of differing transmission priorities, and the buffer unit may be operable to manage the transmission of data differently according to the different transmission priorities.

For example, in some implementations the data streams may be associated with different degrees of delay tolerance. For example, whereas applications associated with data from a first data stream may be able to tolerate a delay in receiving data of several hours or even days, other applications may only be able to tolerate delays of a few minutes. In general the degree of tolerance to delays will depend on how quickly the data needs to be reacted to. For example, data representing stock levels in a large warehouse may only be reviewed daily during a single stock check so that several hours of delay is not problematic. Similarly, data represent consumption of a utility may be needed for monthly billing, in which case delays of a day or more may be considered acceptable. In other case, for data from an alarm sensor, it may be preferable to avoid any delay.

Thus, in accordance with this some example embodiments, different data can be delayed to a different extent depending on the different delay tolerances of the data.

In some examples the different transmission priorities for the data may be predefined based on the source of the data and/or the nature of the data. In other examples the different transmission priorities for the data may be assigned based on a self-learning process.

In some examples the apparatus may comprise a switch operable to in effect bypass the buffer unit and send data to be transmitted directly to the transmitter without being delayed in the buffer unit.

The telecommunications system may be a wireless telecommunications system, such as a 3GPP/LTE system. The apparatus may comprise a wireless subscriber unit (user equipment/terminal), for example a machine-type communication device. In other examples the apparatus may comprise a network infrastructure element, for example, the apparatus may be a functional unit of a base station/transceiver, or of a core network element.

The data received form the one or more sources of data for transmission may comprise packet data including an identifier of the one or more sources of data the data from which the data are received.

In accordance with another aspect of the invention, a communication system is provided comprising one or more sources of data, a transmitter for transmitting data from the one or more sources of data and a receiver for receiving data transmitted by the transmitter, and further comprising a buffer unit arranged to receive data from the one or more sources of data and to forward the data to the transmitter for transmission to the receiver, wherein the buffer unit is configured to accumulate data before forwarding the data to the transmitter and to forward accumulated data to the transmitter for transmission when an amount of data accumulated in the buffer unit reaches a predefined threshold.

In accordance with another aspect of the invention there is provided a method of managing data transmission in a telecommunications system, the method comprising: receiving data from one or more sources of data; accumulating the received data in a buffer unit; determining an amount of accumulated data in the buffer unit; and forwarding accumulated data from the buffer unit to the transmitter for transmission when an amount of data accumulated in the buffer unit reaches a predefined threshold.

In accordance with yet another aspect of the invention there is provided a machine type communication device for transmitting data in a wireless telecommunications system, the apparatus comprising a buffer unit arranged to accumulate data from one or more sources of data and to forward the data to a transmitter for transmission when an amount of data accumulated in the buffer unit reaches a predefined threshold.

Various further aspects and embodiments of the present invention are defined in the appended claims.

BRIEF DESCRIPTION OF THE DRAWINGS

Embodiments of the present invention will now be described by way of example only with reference to the accompanying drawings where like parts are provided with corresponding reference numerals and in which.

DETAILED DESCRIPTION

Figure 1:
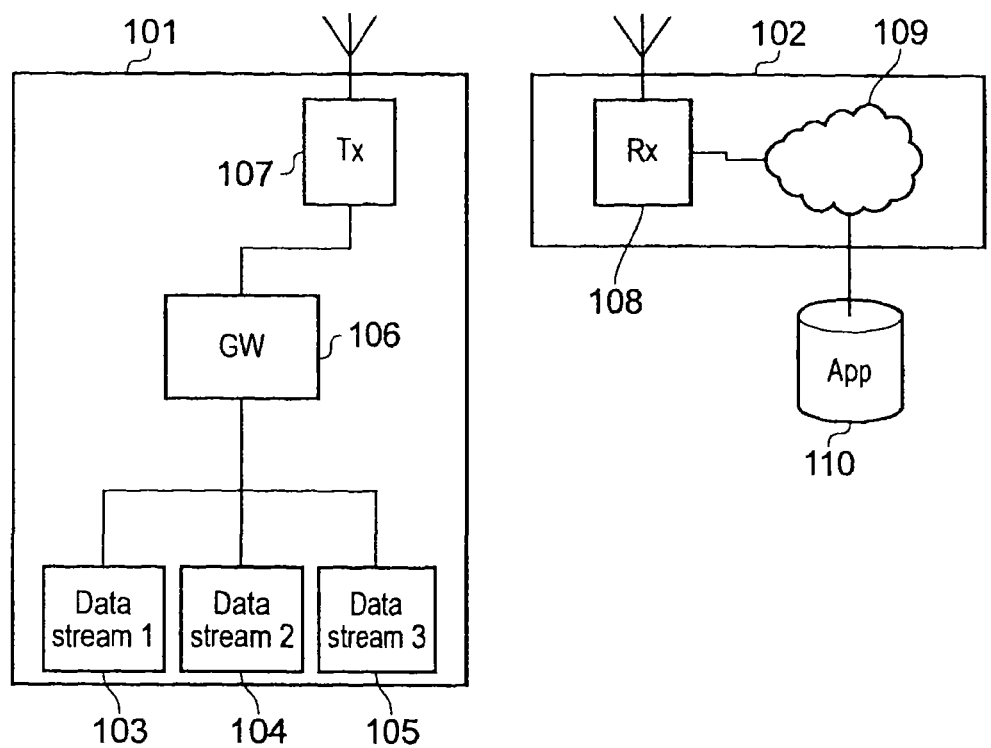
FIG. 1 provides a schematic diagram illustrating an example of a conventional communication system.

FIG. 1 shows a schematic diagram illustrating an example of a conventional wireless communication system. The communication system includes a transmitter unit 101 which is arranged to communicate data to a network 102. The transmitter unit 101 includes a first data stream 103, a second data stream 104 and a third data stream 105. The data streams send data to a data gateway 106. The data gateway 106 converts the data received from the data streams 103, 104, 105 into a format suitable for wireless transmission and sends the data to a transmitter 107 which wirelessly transmits the data to a receiver 108 in the network 102 via a wireless interface. The received data is sent via network routing 109 to an application server 110 which processes the received data as required. The data streams may each originate from different devices such as a sensor providing various telemetry information to the application server 110.

The wireless interface may be provided using conventional cellular communication network techniques. Accordingly, each time data is transmitted from the transmitter unit 101 to the network 102, communication resources such as logical data channels and radio bearers must be established between the radio access elements of the network 102 and the transmitter unit 101.

The communication system shown in FIG. 1 transmits data from the transmitter unit 101 to the network 102 whenever data is received by the data gateway 101. The inventors have recognised that transmitting data in this manner can be very inefficient if intermittently transmitting low quantities of data. For example in some applications such as machine type communications (MTC) the transmitter unit may only transmit a few kilobytes of data once or twice an hour. This can result in an inefficient use of radio resources given that the wireless interface may support uplink data transfer rates of greater than a megabyte per second. Moreover, every time data is sent from the transmitter unit 101, network resources such as logical data channels and physical radio channels are established between the transmitter unit 101 and the network 102 requiring substantial amounts of signalling data to be exchanged between the transmitter unit 101 and the network 102. Establishing these resources can be computationally and resource intensive. Frequently negotiating network resources for the transmission of data from the transmitter unit 101 may also result in the transmitter unit 101 consuming more power than is desirable which may, for example, reduce the life time of an internal power supply within the transmitter unit 101.

Figure 2:
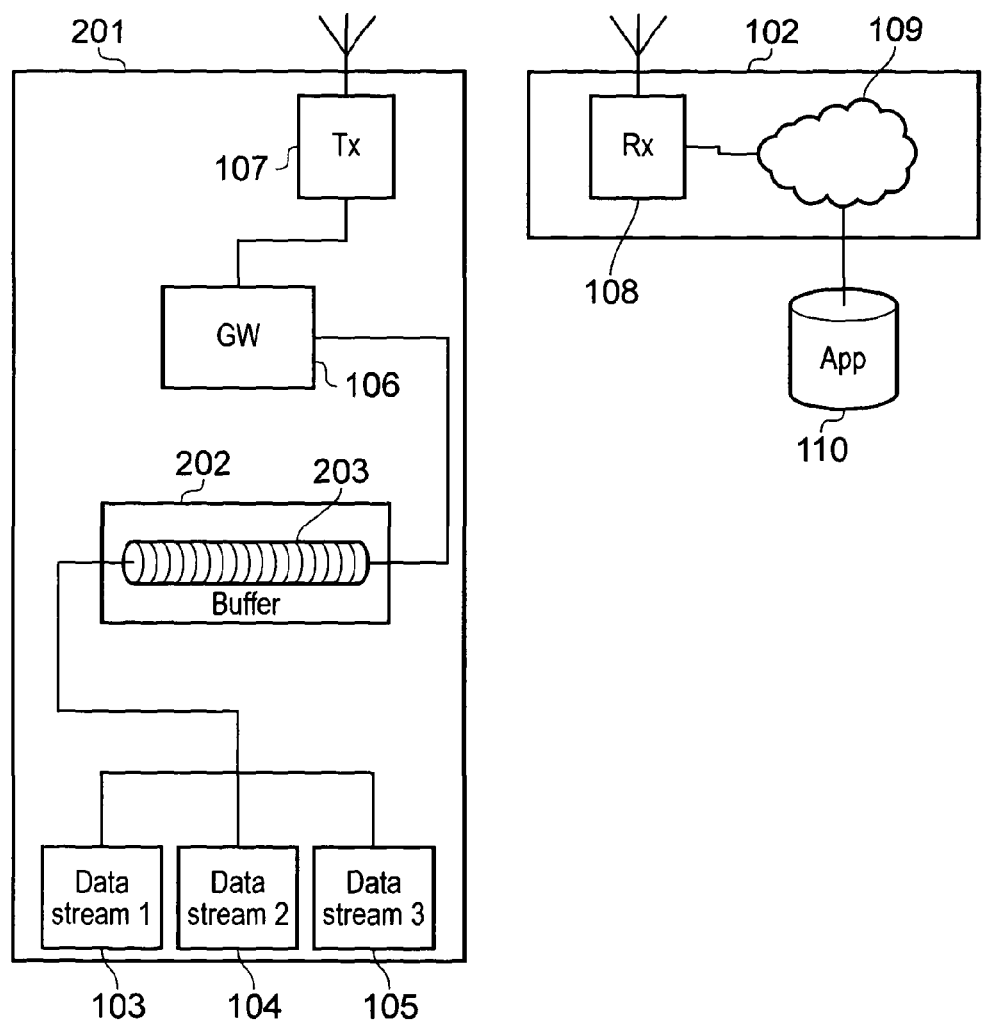
FIG. 2 provides a schematic diagram illustrating a first example of an embodiment of the invention.

FIG. 2 shows a schematic diagram illustrating an example of an embodiment of the present invention. Some elements of the communication system shown in FIG. 2 are similar to and will be understood from corresponding elements of the communication system shown in FIG. 1 and are labelled with corresponding reference numerals accordingly. These aspects of the communication system are conventional and not described further. The example of the communication system shown in FIG. 2 includes a transmitter unit 201 and a network 102. As with the communication system shown in FIG. 1, the transmitter unit 201 comprises a number of data streams 103, 104, 105 which provide data to be transmitted to the application server 110. The data streams may, for example, represent data from machine-type terminals for providing machine-type communications (MTC).

However, unlike the transmitter unit shown in FIG. 1, the transmitter unit 201 illustrated in FIG. 2 includes a buffer unit comprising a delay buffer 202. The buffer unit is positioned between the data gateway 106 and the data streams 103, 104, 105. The delay buffer 202 comprises a buffer memory 203 which stores data sent from the data streams 103, 104, 105. When the amount of data stored in the buffer memory 203 reaches a threshold amount, the delay buffer 202 sends the contents of the buffer memory 203 to the data gateway 106 which then converts the data into a format suitable for wireless transmission and sends the data to the transmitter 107 which wirelessly transmits the data to the receiver 108 in the network 102. The amount of data for triggering transmission (i.e. the threshold) will depend on the application at hand, for example, on the expected rates of data aggregation and the amount of delay that can be tolerated. In one example the threshold amount might be on the order of a few tens or hundreds of kilobytes, for example 64 kilobytes.

The delay buffer 202 thus aggregates data from the data streams 103, 104, 105 and allows an increased quantity of data to be transmitted from the transmitter unit 201 in a single "burst" rather then repeatedly transmitting small quantities of data as is the case in the conventional communication system shown in FIG. 1.

The threshold amount in some examples may be determined by the size of the buffer memory 203. In other words, when there is no space left to accommodate any further data received from the data streams, the data is sent from the delay buffer to the transmitter 107 for transmission to the network 102. In other examples the threshold amount may be dynamic, For example, if it is decided an update rate of around once a day or so might be appropriate for a particular implementation, the threshold may be set based on the average amount of data typically received for transmission in a preceding number of days.

In the example shown in FIG. 2, the delay buffer 202 is positioned between the data gateway 106 and the data streams 103, 104, 105. However, as will be appreciated, it is possible that the buffer can be placed at any appropriate position between the data streams 103, 104, 105 and the transmitter 107. Furthermore, although the data gateway 106 and the transmitter 107 are shown as separate entities, it will be appreciated in some examples these entities may be realised in a single transmitter block. It will also be understood that in a typical network implementation, the transmitter unit 201 may be one of many transmitter units in a network which comprises many receivers.

Figure 3:
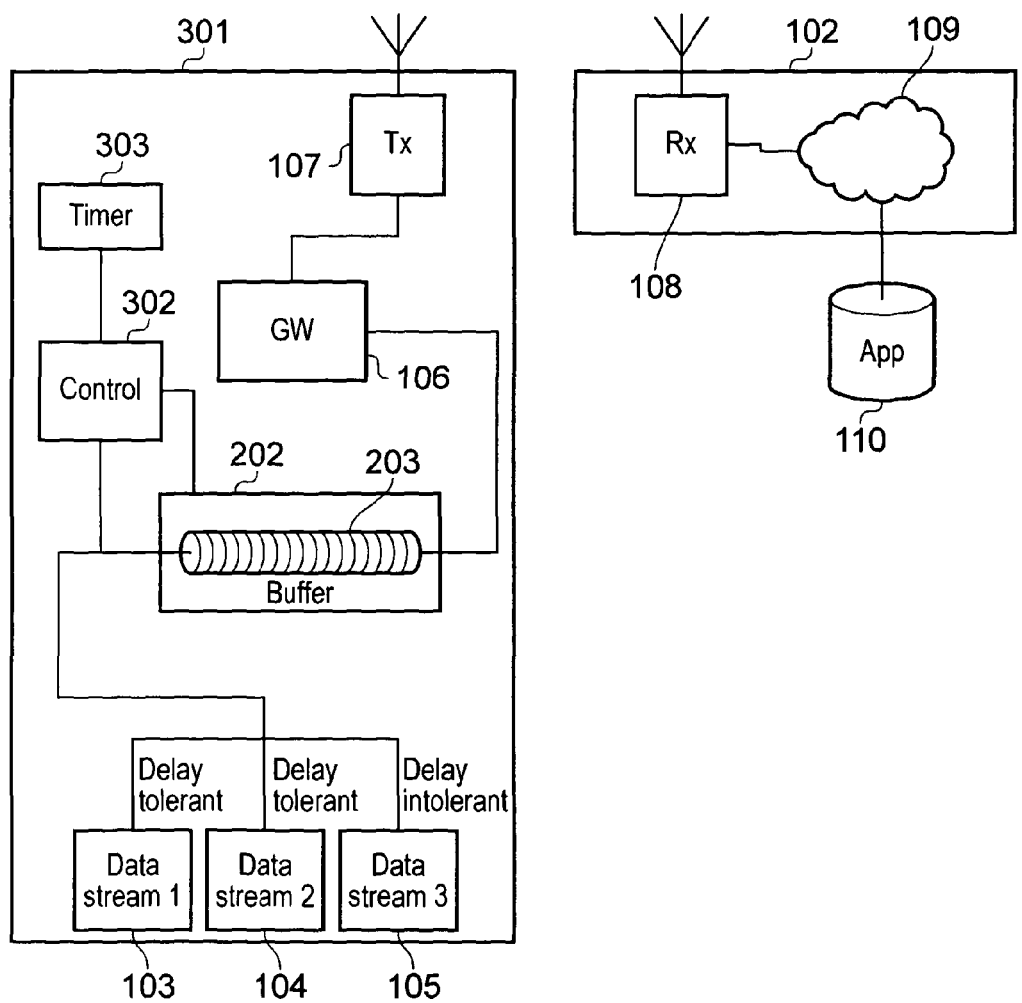
FIG. 3 provides a schematic diagram illustrating a second example of an embodiment of the invention including a timer and a control unit.

FIG. 3 shows a schematic diagram illustrating an example of another embodiment of the invention. FIG. 3 shows a communication system that corresponds to the communication system shown in FIG. 2 except in the example shown in FIG. 3, a transmitter unit 301 includes a buffer control unit 303 connected to a timer 302.

In some examples, data from different data streams may have different transmission priority requirements. In the example shown in FIG. 3, data from the first data stream 103 and the second data stream 104 relate to data which may not need to be received by the application server 110 immediately. Accordingly, data from the first data stream 103 and the second data stream 104 may be classed as "delay tolerant" data. On the other hand, data from the third data stream 105 relates to data which must be received by the application server 110 with as shorter delay as possible. Accordingly, data from the third data stream 105 is classed as "delay intolerant" data. Thus data from the different sources have different transmission priorities (in other examples different types of data from the same source/data stream may have different transmission priorities).

As with the example of the embodiment set out above in relation to FIG. 2, in the communication system shown in FIG. 3, when the amount of data stored in the buffer memory 203 reaches a threshold amount, the data from the data streams stored in the buffer memory 203 is sent to the data gateway 106 and then to the transmitter 107 which wirelessly transmits the data to the receiver 108 in the network 102. However, in the example shown in FIG. 3, the control unit 302 is arranged to monitor the data sent from the data streams 103, 104, 105 to the delay buffer 202. If the control unit 302 detects that data being sent to the delay buffer 202 includes data from a delay intolerant data stream (i.e. data sent from the third data stream 105), then when the data from the delay intolerant data stream has entered the delay buffer 202, the contents of the buffer memory 203 including the data from the delay intolerant data stream is sent to the transmitter for transmission to the network. This is irrespective of whether or not the buffer memory has reached the threshold amount.

Thus in this example when delay intolerant data enters the delay buffer 202 the data in the delay buffer is sent to the transmitter for transmission. This means delay intolerant data is not unduly delayed in the delay buffer which in some implementations may be undesirable.

The control unit 302 is configured to determine whether or not data of a given data stream is delay tolerant data or delay intolerant data using any suitable technique. For example, data sent on the various data streams 103, 104, 105 may include delay tolerance indication data that indicates whether or not data from that data stream is delay tolerant or delay intolerant (or graded accordingly as somewhere in between). In other examples the control unit 302 may be provided with a delay tolerance/source map that indicates the delay tolerance of data from each data stream connected to the delay buffer 202. Thus, in the example shown in FIG. 3, if the control unit 302 detects newly received data input to the delay buffer was from the third data stream 105, the delay tolerance/source map would indicate that this is delay intolerant data and therefore the control unit 302 would control the delay buffer 202 to send all the data in the buffer memory 203 to the transmitter unit 301 regardless of whether or not the threshold is exceeded.

As will be appreciated, if data is infrequently sent to the delay buffer 203, and in particular delay intolerant data is infrequently sent to the delay buffer 203, data will be infrequently transmitted from the transmitter unit to the network. If the threshold amount for triggering transmission is relatively large and the frequency of the data sent on the data streams 103, 104, 105 is relatively low, then data from the first and second data streams 103, 104 may remain in the buffer memory 203 for an undesirably long period of time. Although data from the first and second data streams, 103, 104 is classed as delay tolerant, it may nevertheless be undesirable to delay transmission of this data for an excessively long period of time. Accordingly, in the example shown in FIG. 3, the timer 303 is provided (a similar timer functionality may also be provided in conjunction with other embodiments). The timer 303 is arranged to ensure that data does not remain in the buffer memory 203 for more than a predetermined maximum period of time.

In one example this may be implemented by resetting the timer 303 every time data is sent from the buffer to the data gateway 106. After the timer 303 indicates that a predetermined period of time has elapsed since the last time data was sent from the delay buffer 202, the control unit 302 controls the delay buffer 202 to send the contents of the buffer memory 203 to the data gateway 106 for transmission to the network 102 and again resets the timer. This ensures that data from the data streams 103, 104, 105 will remain in the delay buffer 202 for a period no longer than the predetermined period. As will be understood, any suitable method of ensuring that data does not remain in the delay buffer 202 for more than the predetermined maximum period of time can be used. For example, the timer may be started when the first data for transmission is received after the buffer was last emptied.

Although shown together in FIG. 3, in some examples the transmitter unit 301 may include the functionality of the control unit 302 determining whether or not data from a given data stream is delay tolerant but without the functionality of the timer. Alternatively, in other examples the transmitter unit 301 may include the functionality of the timer 303 without the functionality of the control unit 302 determining whether or not data is delay tolerant.

Figure 4:
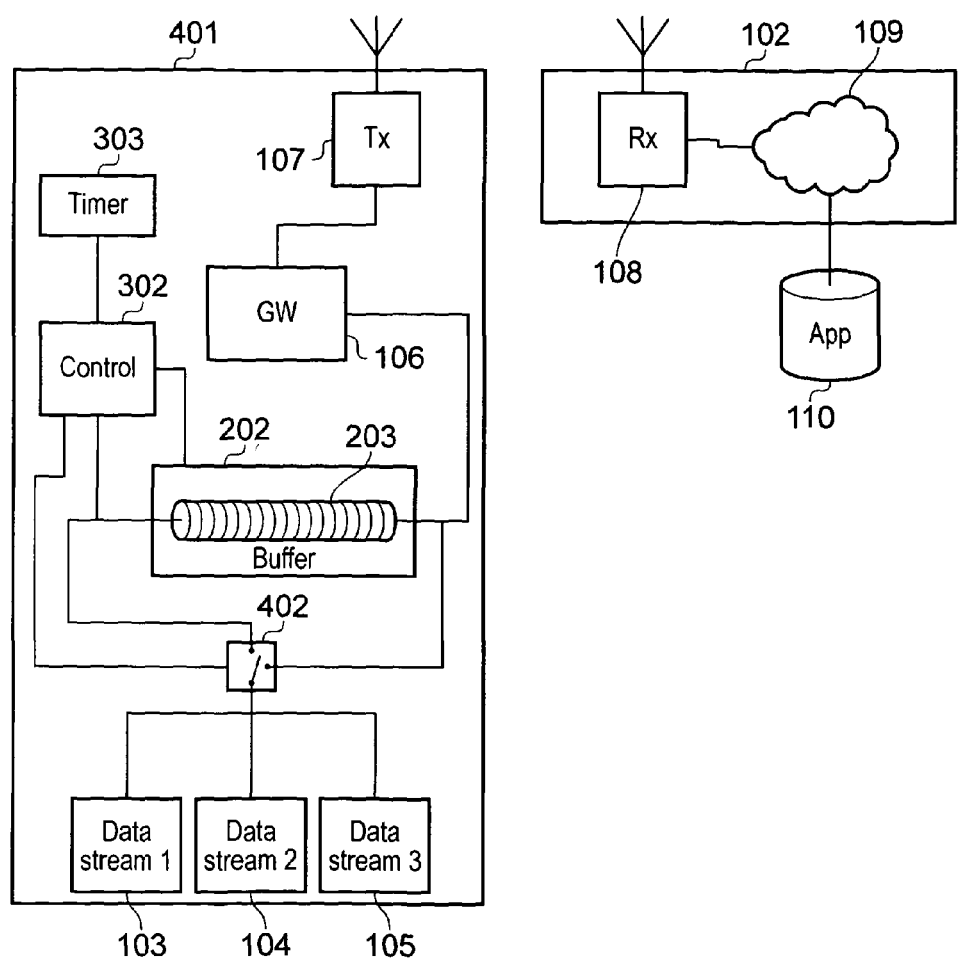
FIG. 4 provides a schematic diagram illustrating a third example of an embodiment of the invention including a buffer switch.

FIG. 4 shows a schematic diagram illustrating an example of another embodiment of the invention. FIG. 4 shows a communication system that corresponds to the system shown in FIG. 3 except in the example shown in FIG. 4, a transmitter unit 401 includes a buffer switch 402. The buffer switch 402 is arranged to switch between sending data to the delay buffer 202 or directly to the data gateway 106. When the buffer switch is in a first position in which data is sent to the delay buffer 202, the transmitter unit operates as described above with reference to FIG. 3. However, when the switch is in a second position, the delay buffer 202 is bypassed and data is sent directly to the data gateway 106 for immediate transmission to the network 102.

In accordance with the example shown in FIG. 4 it is possible to switch between using the delay buffer to store data from the data streams 103, 104, 105 and sending the data from the data streams 103, 104, 105 directly to the gateway 206 in a broadly conventional manner. This enables the delay buffer 202 to be bypassed. There are a number of scenarios in which this may be desired. For example if, in a given implementation, the consumption of network resources is not a primary concern (for example if there are few other devices communicating with the network), data from the data streams may as well be sent to the network 102 without delay. Thus, if the transmitter unit 401 is powered by external power supply for some of the time and an internal power supply provided by a battery for the rest of the time, whilst the external power supply is available, the buffer switch 402 can be set to the second position and the delay buffer 202 bypassed.

However, during periods in which the power from the external power supply is unavailable, it may be desirable to reduce the power consumption of the transmitter unit 401 to increase the lifetime of the battery. Accordingly, the control unit 302 can be arranged to detect when the transmitter unit 401 is powered by the internal power supply and to set the buffer switch 402 to the first position in which data is sent from the data streams 103, 104, 105 to the delay buffer 202. This reduces power consumption as the transmitter unit 401 is required to less frequently undertake the power intensive processing necessary to establish communication with the network 102.

In some examples the control unit 302 may act as a traffic shaping function and itself determine the traffic class (e.g. delay intolerant or delay tolerant) of the various data streams sending data to the delay buffer 203. For example, the control unit may receive information (e.g. a delay tolerance/source map) from an external source explicitly associating certain data streams (i.e. data from particular sources) with certain traffic classes.

Alternatively or additionally, the control unit 302 may include a self learning capability allowing it to determine to which traffic class a particular data stream belongs. This might be particularly helpful in a system including many more than three data streams for which it may be less practical to provide a delay tolerance/source map as described above. For example, for a particular application, the control unit 302 could be pre-programmed with knowledge of a profile of delay tolerant data and a profile of delay intolerant data. After observing data sent on the various data streams, the control unit 302 can be arranged to make a judgement, using for example known neural network techniques or known fuzzy logic techniques, whether or not data from a particular data stream is delay tolerant data or delay intolerant data. After this the control unit 302 can be arranged to assign a particular traffic class to a particular data stream.

In some examples, the control unit may be adapted to accommodate several classes of data stream. A first class may be considered to be completely delay intolerant and treated in accordance with the delay intolerant data described above. However, there may also be a number of "intermediate" classes of delay tolerance each having a different level of delay tolerance which determine how long such data can remain in the delay buffer 203. In such examples the control unit 302 can be arranged to monitor the class the "least" delay tolerant currently in the delay buffer 203 and adapt the predetermined time for which data is retained in the delay buffer 203 by controlling the timer accordingly. The following table illustrates this concept:

| Delay Tolerance Class | Maximum period of time data can remain in buffer |
|---|---|
| High | 24 hours |
| Medium | 1 hour |
| Low | 60 seconds |
| Non delay tolerant | Data transmitted as soon as received at delay buffer |

LTE Implementation

Figure 5:
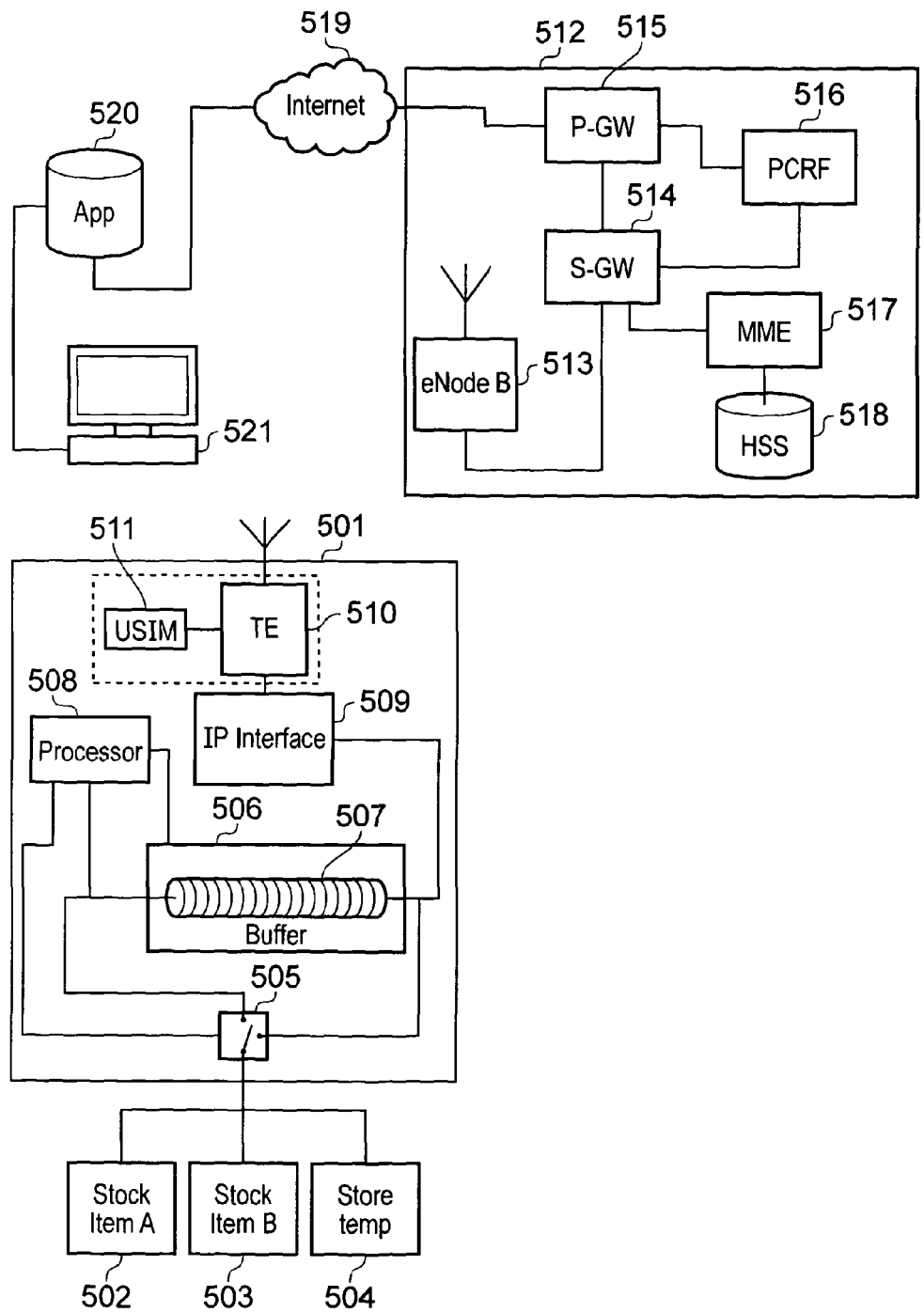
FIG. 5 provides a schematic diagram illustrating an implementation of an example of the invention in a 3GPP (Long Term Evolution) LTE telecommunications network.

FIG. 5 shows a schematic diagram illustrating an implementation of an example of the invention in a 3GPP (Long Term Evolution) LTE telecommunications network. The LTE network is described in terms of 3GPP functional elements as will be understood from the well understood and well established standards. The example shown in FIG. 5 is an MTC system for transmitting MTC data from sensors in a remote device to an MTC application server.

FIG. 5 shows a MTC unit 501 connected to a plurality of sensors 502, 503, 504 which implement a warehouse management system. A first sensor 502 receives sensor input which corresponds to a quantity of stock item "A" stored in a storage location and a second sensor 503 receives sensor input which corresponds to a quantity of stock item "B" stored in the storage location. A third sensor 504 receives sensor data which corresponds to a temperature of the storage location. In response to sensor input, each of the plurality of sensors 502, 503, 504 are arranged to output data packets corresponding to the sensor input to the MTC unit 501 via a buffer switch 505. The data packets can be in arranged in accordance with any suitable packet data protocol, for example Internet Protocol (IP) and the buffer switch need not necessarily be a physical switch but can be any suitable physical or logical mechanism which can direct data packets output from the sensors.

When the buffer switch 505 is in a first position data packets from the sensors are directed to a delay buffer 506. The data packets are stored in a buffer memory 507 in the delay buffer 505 and under the control of a processor 508 the data packets stored in the buffer memory 507 are forwarded to a data interface 509 such as an Ethernet interface or a USB interface. The data interface forwards the data to an LTE terminal equipment (TE) unit 510. The IF unit 510 is connected to a universal subscriber identity module (USIM) 509 which identifies the TE unit 50 as is known in the art. The TE unit 510 and the USIM 511 together comprise functionality corresponding to a LTE user equipment (UE). The TE 510 transmits the data from the data gateway 509 to a LTE network.

The LTE network 512 includes an evolved Node B (eNodeB) 513, a serving gateway (S-GW) 514, a packet data network gateway (P-GW) 515 and a Policy and Charging Resource Function (PCRF) 516. The LTE network 510 also includes a mobility management entity (MME) 517 and a home subscription server (HSS) 518. The functions of the elements of the LTE network 512 are known in the art and therefore will not be described further.

An MTC application server 520 is connected to the LTE network 512 via an external data network 519 such as the internet connected to the P-GW 515. In the example implementation shown in FIG. 5, the MTC application server 520 is connected to a user terminal 521 which allows the quantity of stock items "A" and "B" to be monitored along with the temperature of the storage location.

In a first mode of operation, the MTC unit 501 is not connected to an external power source and is instead powered by an internal battery. Accordingly, it is helpful to minimise power consumption. In this mode, the processor 508 is arranged to control the buffer switch 505 to the first position connecting the output from the sensors 502, 503, 504 to the delay buffer 506.

When a unit of stock item "A" or a unit of stock item "B" is removed from the storage location, the corresponding first sensor 502 or second sensor sends a data packet to the delay buffer indicating that stock level has changed. The processor 508 is arranged to inspect each data packet sent to the delay buffer 506 to determine if it is delay tolerant or delay intolerant data. This can, for example, be indicated in the header of each packet sent from the sensors.

In this example, data from the first and second sensors are considered to be delay tolerant. Accordingly, data packets from these sensors are stored in the buffer memory 507 of the delay buffer 506. The processor 508 monitors the delay buffer and if it is detected that the buffer memory 507 is full or if the last time data was sent from the delay buffer 506 to the data interface 509 has exceeded a predetermined threshold time, for example 24 hours, then the processor 508 controls the delay buffer to send the contents of the buffer memory 507 to the data interface 509.

Alternatively, if a data packet is sent from the third sensor 504 indicating for example that the temperature in the storage location has risen above a threshold level, it may be desirable to raise an alarm on the user terminal as soon as possible. Accordingly, data packets sent from the third sensor 504 are considered delay intolerant which is indicated in the header of packets sent from the third sensor 504. When the processor 508 detects that a data packet from the third sensor 504 has been sent to the delay buffer 506, the processor 508 controls the delay buffer to send the contents of the buffer memory 507, including any already stored delay intolerant data packet, to the data interface 509.

Upon receiving the data packets from the delay buffer 506, the data interface 509 converts the data packets into a suitable format and forwards them to the TE unit 510. Upon receipt of the data packets from the data interface 509, the TE unit 510 is arranged to establish a radio connection with the eNodeB 513 and negotiate access to uplink data transmission resources as is known in the art. In the example shown in FIG. 5 this would involve the TE unit 510 changing from a RRC_IDLE state to a RRC_CONNECTED STATE and sending the data on a logical uplink shared channel (UL-SCH) via a physical uplink shared channel (PUSCH). The data sent from the TE unit 510 is addressed to the MTC application server 520.

After the data from the TE unit 510 is received by the eNode B 513, it is forwarded to the S-GW 514 and onto the P-GW 515. The P-GW 514 then sends the data to the external network 519 where it is routed to the MTC application server 520. The MTC application server 520 interprets the data and sends it to the user terminal 521 were it is displayed appropriately.

In a second mode of operation, the MTC unit is connected to an external power source and therefore the consumption of power is not an issue. In this mode of operation the processor 508 is arranged to control the buffer switch 505 to a second position to direct all data packets from the sensors to the data interface 509 bypassing the delay buffer.

Figure 6:
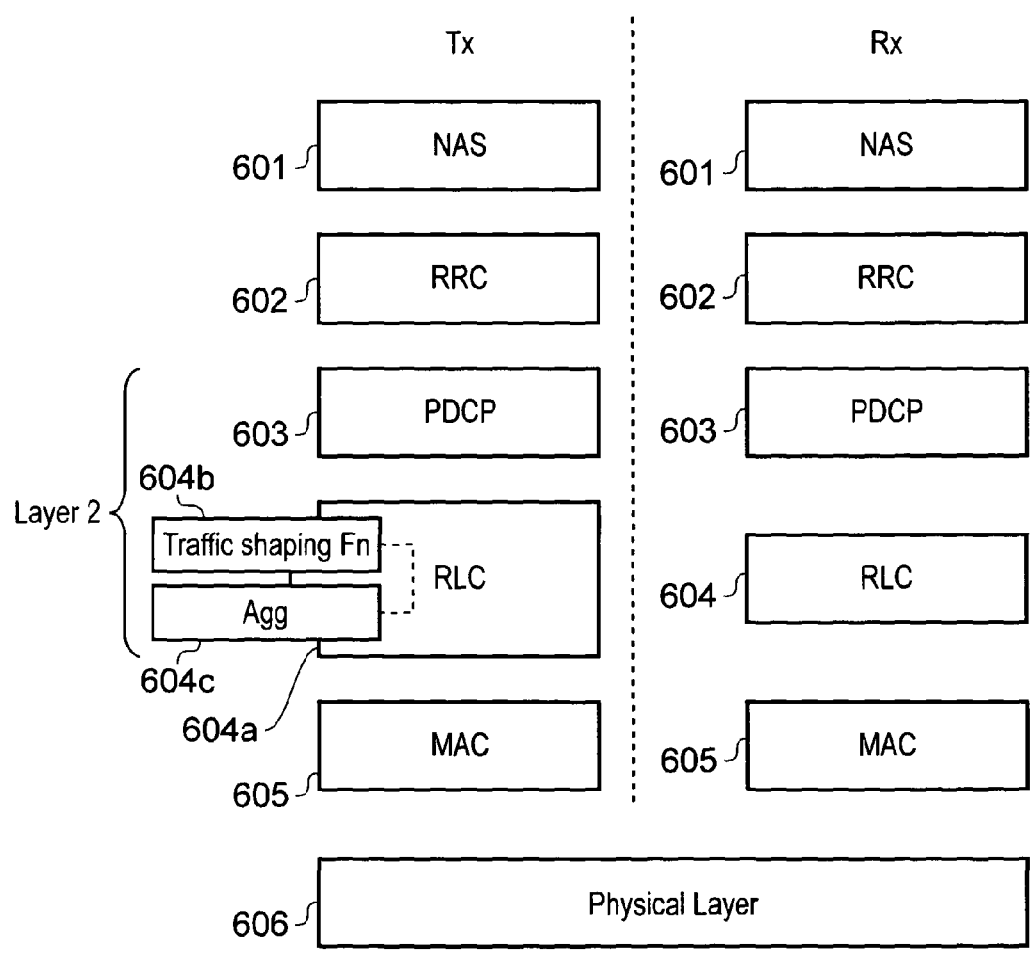
FIG. 6 provides a schematic diagram illustrating an example of a simplified protocol stack for a transmitter node Tx and a receiver node Rx of a communication system arranged in accordance with an embodiment of the invention.

As will be appreciated, implementation of embodiments of the present invention are not restricted to the example systems described above. More generally embodiments of the invention can be implemented at any suitable point within a network which involves the transmission of data from a transmitter node to a receiver node. FIG. 6 shows a schematic diagram illustrating a example of a simplified protocol stack for a transmitter node Tx and a receiver node Rx of a communication system arranged in accordance with an example of the present invention.

The stack includes a non-access stratum (NAS) layer 601, a radio resource control (RRC) layer 602, a packet data convergence protocol (PDCP) layer 603, a radio link control (RLC) layer 604, a medium access control (MAC) layer 605 and a physical layer 606 which connects the transmitter node Tx side with the Receiver node Rx side. The general function of these various network layers are well known in the art.

The transmitter node Tx side RLC layer 604a includes a traffic shaping function 604b and an aggregator function 604c.

The aggregator function 604c provides the same logical functionality as the delay buffer described with reference to FIGS. 2 to 4, i.e. providing a buffer within which data to be transmitted can be temporarily stored prior to transmission. The traffic shaping function 604b provides the same logical functionality as the control unit described with reference to FIGS. 2 to 4. For example, both user and control stream data from the higher layers can be collected by the aggregator function 604c so that variable transmission delays can be applied depending on the priority and delay tolerance of the data. Higher priority transmission can trigger lower priority data to be "piggybacked" and sent in fewer or even one burst via the physical layer. Maximum delay timers are defined as a safeguard to prevent excessive delays being applied to lower priority streams.

In some examples the aggregator function 604c may manage bearer configuration/re-configuration based on statistics collected over a period of time. The bearer parameters reflect bucket (buffer) type and traffic sources associated with them. Buckets configurations and policies can be managed dynamically by the user and/or the operator by means of signalling and this process may be enhanced by dynamic re-configured performed by the traffic shaping function.

As explained with reference to the control unit above, the traffic shaping function 604b performs traffic shaping for individual data streams from higher layers and controls the traffic aggregation performed by the aggregator function 604c for collection of data from the data streams based on known key properties of these streams (for example a priori knowledge or self learning capability). As explained above, very delay insensitive traffic may not be transmitted until higher priority real time data are placed in buffers and then radio resources are requested.

In the example shown in FIG. 6, the traffic shaping function 604b and the aggregator function 604c are shown implemented at the RLC layer. However, it will be understood that the traffic shaping function 604b and the aggregator function 604c can be implemented at any appropriate layer. For example, for uplink data originating from a UE operating in a UMTS or LTE network, the functionality could be located at any suitable position at any of the layer 2 layers (e.g. PDCP, RLC or MAC) or alternatively at a higher level operating system (OS) layer (not shown in FIG. 6).

Furthermore, for downlink traffic, the traffic shaping function and the aggregator function could be located in a RNC and/or SGSN of a UMTS telecommunication system or an eNodeB and/or an S-GW of an LTE telecommunication system.

Figure 7:
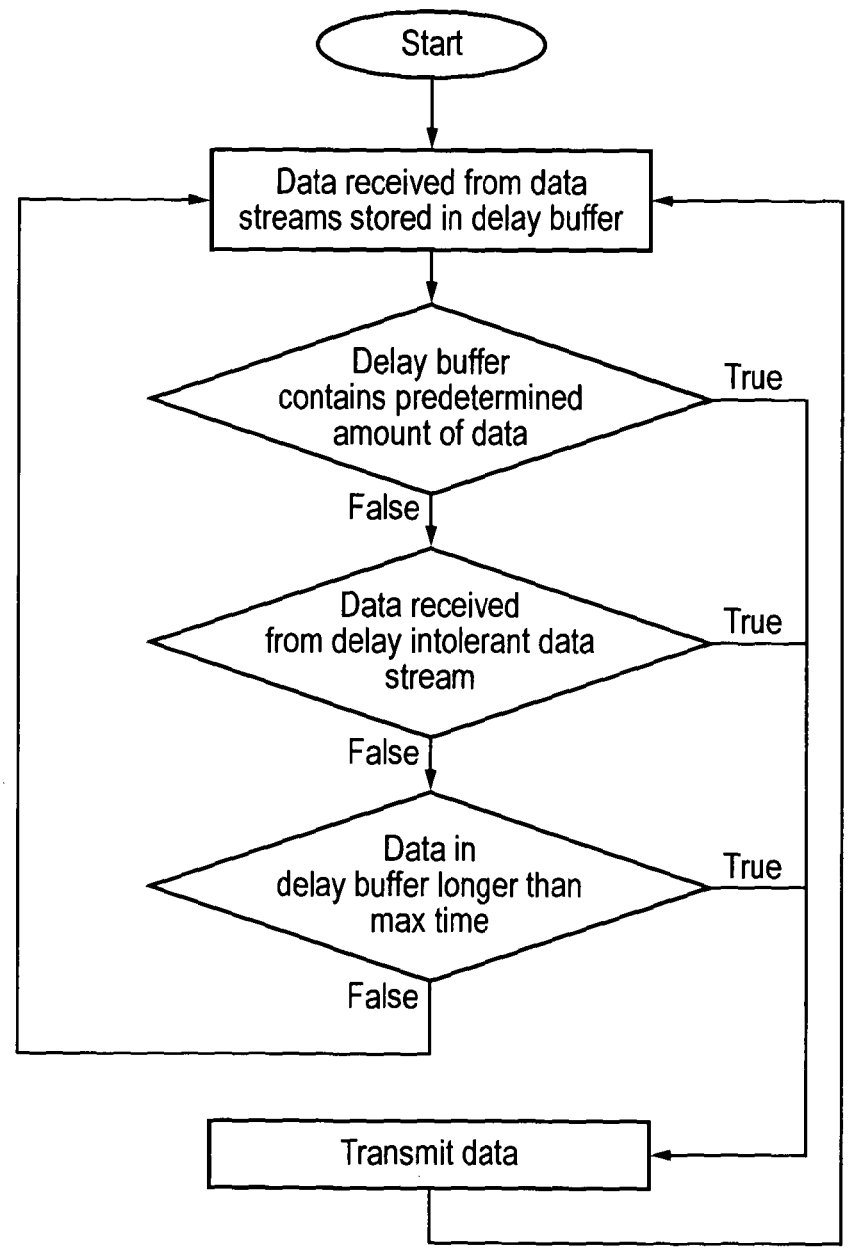
FIG. 7 provides a schematic diagram of a process flow illustrating a method according to an embodiment of the present invention.

FIG. 7 shows a schematic diagram of a process flow illustrating a method according to an example of the present invention. As can be seen, data from the data streams is received at the delay buffer. If the delay buffer contains a predetermined amount of data, a predetermined period of time elapses meaning data has remained in the delay buffer for a maximum period of time or delay intolerant data is received at the delay buffer, then the data in the delay buffer is transmitted.

Various modifications may be made to the embodiments herein before described. For example it will be understood that the particular component parts of which the transmitter unit and MTC unit described above are comprised, for example the delay buffer, the buffer memory, the control unit and the processor are essentially logical designations. Accordingly, the functionality that these component parts provide may be manifested in ways that do no conform precisely to the forms described above and shown in the diagrams. For example aspects of the invention may be implemented in the form of a computer program product comprising instructions that may be implemented on a processor stored on a data carrier, for example a non-transitory medium, such as a floppy disk, optical disk, hard disk, PROM, RAM, flash memory or any combination of these or other storage media, or transmitted via data signals on a network such as an Ethernet, a wireless network, the Internet, or any combination of these of other networks, or realised in hardware as an ASIC (application specific integrated circuit) or an FPGA (field programmable gate array) or other configurable or bespoke circuit suitable to use in adapting the conventional equivalent device.

Although examples of the invention have been described largely in terms of a delay buffer being implemented in a remote terminal for transmitting data to a receiver in a network, it will be understood that the delay buffer can be implemented in the transmitter of the network for transmitting data to a receiver in the remote terminal. For example a delay buffer can be connected to a transmitter in a base station for transmitting data to a receiver in a mobile terminal.

Furthermore, although examples of the invention have been described largely in terms of wireless telecommunication systems, it will be understood that the invention can also be implemented in other communication systems such as internet systems and fixed line telecommunication systems. The invention could also be implemented in systems in which data is communicated between software modules for example in an operating system in which data is transmitted via virtual ports.

The invention claimed is:

1. An apparatus for managing data transmission in a telecommunications system, the apparatus comprising:
  circuitry configured to
    receive data from one or more sources of data
    accumulate data before forwarding the data to a transmitter; and
    forward accumulated data to the transmitter when an amount of data accumulated in the buffer unit reaches a predefined threshold, wherein
  the circuitry is configured to forward accumulated data to the transmitter for transmission before the amount of data accumulated reaches the predefined threshold if there is data in the buffer that has been stored for more than a predefined time period.

2. The apparatus according to claim 1, wherein the circuitry is configured to forward accumulated data to the transmitter for transmission before the amount of data accumulated reaches the predefined threshold if further data is received which is classified as data that should not be delayed.

3. The apparatus according to claim 1, wherein
data received from the one or more sources of data comprise data of differing transmission priorities, and
the circuitry is configured to manage the transmission of data differently according to the different transmission priorities.

4. The apparatus according to claim 3, wherein
the different transmission priorities for the data are predefined based on the source of the data.

5. The apparatus according to claim 3, wherein
the different transmission priorities for the data are assigned based on a self-learning process.

6. The apparatus according to claim 1, wherein
the circuitry is configured to send data to be transmitted to the transmitter without first being accumulated.

7. The apparatus according to claim 1, wherein the accumulating is implemented at a radio link control layer.

8. The apparatus according to claim 1, wherein the apparatus comprises a wireless subscriber unit.

9. The apparatus according to claim 8, wherein
the wireless subscriber unit comprises a machine-type communication device.

10. The apparatus according to claim 8, wherein
the telecommunications system is a wireless telecommunications system.

11. The apparatus according to claim 1, wherein the apparatus comprises a network infrastructure element.

12. The apparatus according to claim 1, wherein
the data comprise packet data including an identifier of the one or more sources of data from which the data are received.

13. A communication system comprising:
one or more sources of data, a transmitter for transmitting data from the one or more sources of data and a receiver for receiving data transmitted by the transmitter; and
circuitry configured to
receive data from the one or more sources of data;
accumulate data before forwarding the data to the transmitter; and
forward accumulated data to the transmitter for transmission when an amount of data accumulated in the buffer unit reaches a predefined threshold, wherein
the circuitry is configured to forward accumulated data to the transmitter for transmission before the amount of data accumulated reaches the predefined threshold if there is data in the buffer that has been stored for more than a predefined time period.

14. A method of managing data transmission in a telecommunications system, the method comprising:
receiving data from one or more sources of data;
accumulating the received data in a buffer;
determining an amount of accumulated data in the buffer;
forwarding accumulated data from the buffer to the transmitter for transmission when an amount of data accumulated in the buffer reaches a predefined threshold; and
forwarding accumulated data to the transmitter for transmission before the amount of data accumulated in the buffer reaches the predefined threshold if there is data in the buffer that has been stored for more than a predefined time period.

15. The method according to claim 14, further comprising:
forwarding accumulated data to the transmitter for transmission before the amount of data accumulated in the buffer reaches the predefined threshold if further data is received by the buffer unit which is classified as data that should not be delayed.

16. The method according to claim 14, wherein data received from the one or more sources of data comprise data of differing transmission priorities, and wherein the transmission of data is managed differently according to the different transmission priorities.

17. A non-transitory computer readable medium storing computer executable instructions, which when loaded on to a computer causes the computer to perform the method according to claim 14.

18. A machine type communication device for transmitting data in a wireless telecommunications system, the apparatus comprising:
circuitry configured to accumulate data from one or more sources of data and to forward the data to a transmitter for transmission when an amount of data accumulated in the buffer unit reaches a predefined threshold, wherein
the circuitry is configured to forward accumulated data to the transmitter for transmission before the amount of data accumulated reaches the predefined threshold if there is data in the buffer that has been stored for more than a predefined time period.

* * * * *